United States Patent [19]

Boaz

[11] 4,004,126
[45] Jan. 18, 1977

[54] WINDSHIELD HEATING DEVICE

[75] Inventor: Premakaran T. Boaz, Southgate, Mich.

[73] Assignee: Ford Motor Company, Dearborn, Mich.

[22] Filed: Dec. 15, 1975

[21] Appl. No.: 641,005

[52] U.S. Cl. .................................. 219/203; 52/171; 98/2.08; 98/2.09; 165/41; 219/522; 219/543; 296/84 R

[51] Int. Cl.² ...................... H05B 1/00; E06B 7/12; B60S 1/54

[58] Field of Search .......... 219/202, 203, 522, 543, 219/547; 52/171; 296/84 R, 84 E; 98/2, 2.05, 2.08, 2.09, 2.1; 165/41

[56] References Cited

UNITED STATES PATENTS

| | | | |
|---|---|---|---|
| 2,546,355 | 3/1951 | Bloomer | 219/203 |
| 3,026,401 | 3/1962 | Cheviron | 219/203 |
| 3,177,794 | 4/1965 | Laing | 98/2.09 X |
| 3,331,940 | 7/1967 | Reid | 219/203 |
| 3,624,354 | 11/1971 | Heidorn | 219/203 UX |
| 3,813,519 | 5/1974 | Jochim et al. | 219/203 X |

Primary Examiner—A. Bartis
Attorney, Agent, or Firm—William E. Johnson; Keith L. Zerschling

[57] ABSTRACT

A windshield heating device for a motor vehicle having a windshield with an upper portion normally within the driver's field of vision and a lower portion normally not within the driver's field of vision is disclosed. A plurality of electrically conductive grid lines are deposited on the lower portion of the windshield. The grid lines are bonded to the windshield and are formed of a material which heats up when an electrical current is passed therethrough. An instrument panel of the motor vehicle is mounted adjacent the lower portion of the windshield. The instrument panel has openings therein in juxtaposition with the grid lines on the windshield. Operation of a blower motor directs air over the grid lines when they are heated to cause a moving current of heated air to pass from the lower portion of the windshield to its upper portion. This action defogs and/or defrosts the windshield. The device is particularly useful when the motor vehicle is started initially as the vehicle's heating system has not had sufficient time to come up to proper temperature.

2 Claims, 2 Drawing Figures

WINDSHIELD HEATING DEVICE

BACKGROUND OF THE INVENTION

Most modern-day automobile vehicles include in their heating systems devices for directing heated air over the vehicle's windshield in order to defrost and/or defog the same. Since these heating systems rely on engine generated heat for heating the air which is to be directed over the windshield, the systems take a few minutes before they are fully operable after a cold start of the vehicle. Since many drivers are impatient, they often will start movement of their vehicle before the windshield is fully defrosted or defogged thereby creating a hazardous condition.

The prior art has also taught some quick defrost and/or defog systems but, in general, these structures are relatively expensive. For example, some of the vehicles manufactured by the Ford Motor Company in the 1974 through 1976 model years were equipped with a quick defrost windshield in which the interlayer used for laminating the windshield contained a conductive coating thereon. The windshield was heated, in its entirety by applying an electrical current to the interlayer's conductive coating. This type of quick defrost system was expensive to manufacture because the conductive coating was formed from gold.

It is an object of this invention to provide a relatively low cost windshield heating device which provides added heat for windshield defrosting and/or defogging at times of a vehicle cold start. It is a further object of this invention to provide such a windshield heating device which is relatively economical to build and which is efficient in operation.

SUMMARY OF THE INVENTION

This invention relates to a windshield heating device and, more particularly, to a windshield heating device for use primarily for defrosting and/or defogging of a motor vehicle windshield after the vehicle has been started from a cold start condition.

In accordance with the teachings of this invention the windshield heating device includes a windshield having an upper portion and a lower portion. A plurality of electrically conductive grid lines are deposited on the lower portion of the windshield. These grid lines are bonded to the windshield and are formed of a material capable of heating up when an electric current is passed therethrough. An instrument panel is provided in the motor vehicle adjacent the lower portion of the windshield. The instrument panel has an opening therein in juxtaposition with the grid lines on the windshield. A blower motor including a blower device is mounted in the motor vehicle and an air carrying duct is provided which passes, at least in part, through the instrument panel for providing a passageway interconnecting the blower device of the motor with the opening of the instrument panel. An electric circuit device is provided for supplying power to the plurality of grid lines and the blower motor. When the blower motor and grid lines are operating, the heat generated by the grid lines will heat the air in proximity thereto. The heated air is caused to move from the lower portion of the windshield towards the upper portion of the windshield by operation of the blower motor and blower device. The movement of the warm air initiates the defrosting and/or defogging of the windshield at a time when sufficient heat is not yet available from the engine to provide such defrosting and defogging action. Once the engine has reached proper temperature and the heat sink for the heater system of the vehicle is heated properly, the electrical power to the grid lines may be terminated and the normal defrosting and/or defogging system of the vehicle operated thereafter.

The main benefit of the windshield heating system of this invention is that a relatively inexpensive windshield heating device is provided for heating the vehicle's windshield during the period after a cold start of the vehicle. The grid lines may be deposited on the windshield in a silk screening operation in which a suitable material such as a silver-ceramic paste is applied to the windshield.

DESCRIPTION OF THE PREFERRED EMBODIMENT

Figure 1:
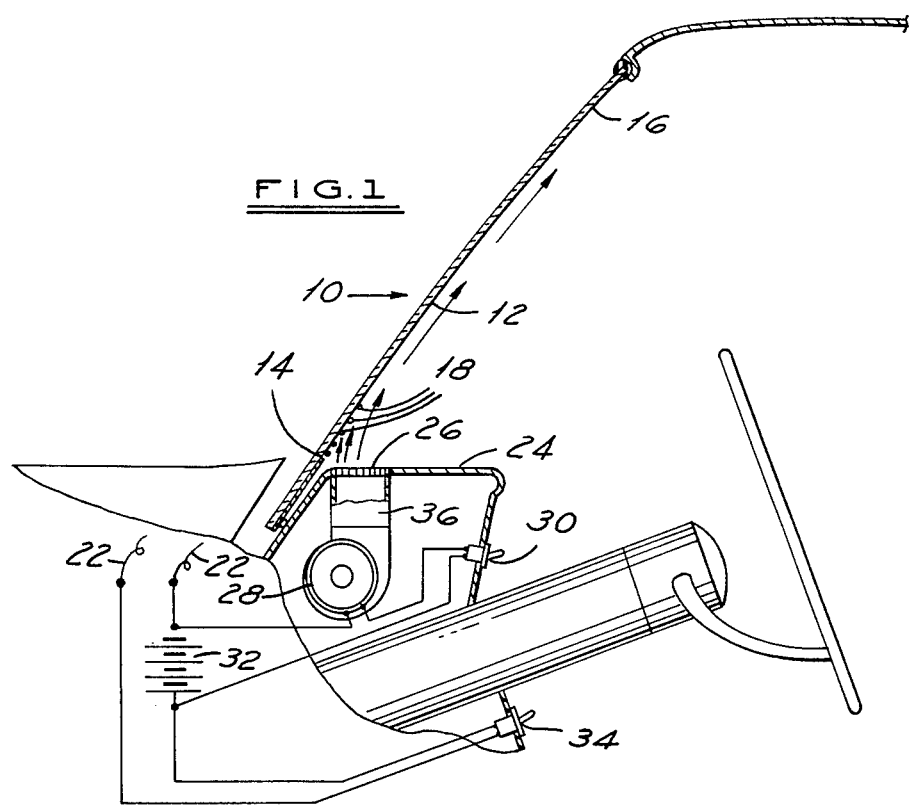
FIG. 1 is a schematic drawing, partly in cross section, of the device of this invention.
Figure 2:
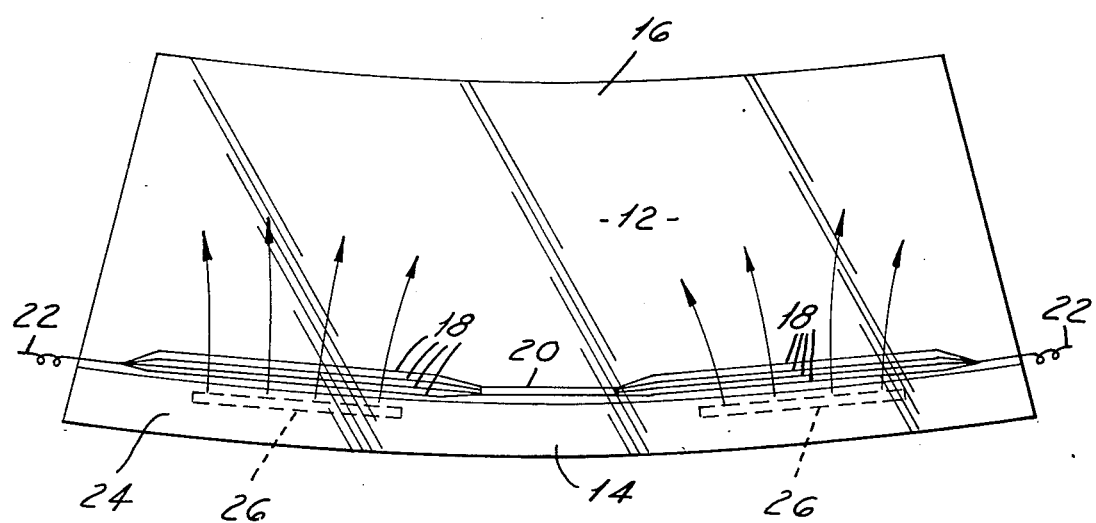
FIG. 2 is a schematic drawing of the windshield of FIG. 1 showing greater details of the grid lines deposited on the windshield.

In FIG. 1 the windshield heating device of this invention is generally identified by the numeral 10. The heating device includes a windshield 12 having a lower portion 14 and an upper portion 16. As best seen in FIG. 2, a plurality of grid lines 18 are formed on both the right side and left side of the lower portion of the windshield. These grid lines are interconnected by a bus bar 20.

The grid lines 18 and the bus bar 20 are formed from an electrically conductive material such as a silver ceramic material which is placed on the windshield in a silk screening operation. The silver-ceramic material is a pliable mass during the silk screening operation but when the windshield is heated in a lehr for the purpose of forming it to a particular shape, the silver ceramic is fired and it becomes bonded to the glass surface. Such silver ceramic material as sold by Engelhard Minerals Company under the name Engelhard 2228 may be used. There are also many other noble metal-ceramic materials on the market which may be used. The grid lines should be about .015 wide and 20 inches long and the bus bar about .75 in width. There should be 5 to 12 grid lines on each side of the windshield so that sufficient heat is generated when electrical power is supplied thereto to provide adequate heating of the air in the vicinity of the grid lines. Electrical leads 22–22 are used to connect the grid lines and bus bar to the electrical system of the motor vehicle.

An instrument panel 24 is mounted in the motor vehicle by normal mounting structure not shown. The instrument panel has openings 26 therein in juxtaposition with the grid lines 18 on the windshield 12.

A blower motor 28, including a suitable blower device for moving air, is mounted by means not shown within the instrument panel 24. This blower motor 28 can be the blower motor which is associated with the heating system of the motor vehicle. A switch 30 is provided in the instrument panel for connecting the motor to a source of electrical potential 32 such as a battery. A second switch 34 is also provided for connecting the source of electrical potential 32 to the electrical leads 22–22 of the grid lines 18. In FIG. 1 this connection of the source of electrical potential and the leads 22–22 is shown schematically because of the manner in which the view is taken. In the preferred construction, the operation of the grid lines is controlled separately from the operation of the blower motor. However, both systems might be actuated by moving a control device of the heating system to a defrost location which would automatically actuate the power system to the grid lines and the blower motor and operate the grid lines for a predetermined length of time, for example 5 minutes.

A duct structure 36 is also included within the interior of the instrument panel 24. This duct structure connects the blower device of the blower motor 28 with the openings 26 in the instrument panel. In such a fashion, operation of the blower motor will cause the movement of air propelled by the blower device through the duct structure to the openings where the air flows over the grid lines 18 on the lower portion 14 of the windshield 12. This air is then directed upwardly toward the top portion 16 of the windshield.

When switches 30 and 34 are turned to their "on" position, electrical power is supplied from the source of electrical potential 32 to both the blower motor 28 and to the electrical leads 22 of the grid lines 18. The application of power to the grid lines causes them to generate heat resistively in the lower portion of the windshield. Operation of the blower motor causes movement of air over the heated grid lines, which air is directed upwardly toward the upper portion 16 of the windshield 12. The movement of heated air over the windshield, of course, causes a defrosting and/or defogging action which aids in removing frost or fog from the windshield. The second switch 34 may be turned off to terminate the application of power to the grid lines 18 once the engine of the motor vehicle has reached operating temperature and the heating system of the vehicle has heat available to it its normal heat sink.

In view of this specification, those skilled in the art will be able to develop modifications of this invention which fall within the true spirit and scope thereof. It is intended that all such modifications be included in the scope of the appended claims.

I claim:
1. A windshield heating device for a motor vehicle which comprises:
 a windshield having an upper portion normally within the driver's field of vision and a lower portion normally not within the driver's field of vision;
 a plurality of grid lines deposited on only said lower portion of said windshield; said lines being bonded to said windshield and being formed of a material capable of heating up when an electric current is passed therethrough;
 an instrument panel in the motor vehicle adjacent said lower portion of said windshield, said instrument panel having an opening therein in juxtaposition with said grid lines on said windshield;
 a blower motor including a blower device mounted in the motor vehicle;
 duct means passing at least in part through said instrument panel for providing a passageway interconnecting said blower device of said blower motor with said opening of said instrument panel so that air moving through said duct means passes out through said opening of said instrument panel and over said plurality of grid lines; and
 electric circuit means for supplying power to said plurality of grid lines and said blower motor.
2. The windshield heating device of claim 1 wherein: said plurality of grid lines are formed into two separated groups and wherein: said instrument panel has an opening in juxtaposition with each group of said grid lines.

* * * * *